US006812615B1

(12) United States Patent
Ettridge

(10) Patent No.: US 6,812,615 B1
(45) Date of Patent: Nov. 2, 2004

(54) ELECTRIC MOTOR

(76) Inventor: John Patrick Ettridge, 53 Branksome Terrace, Dover Gardens (AU), 5048

(*) Notice: Subject to any disclaimer, the term of this patent is extended or adjusted under 35 U.S.C. 154(b) by 48 days.

(21) Appl. No.: 10/187,632

(22) Filed: Jul. 2, 2002

Related U.S. Application Data

(63) Continuation-in-part of application No. 09/673,495, filed as application No. PCT/AU99/00261 on Apr. 8, 1999.

(30) Foreign Application Priority Data

| | | |
|---|---|---|
| Apr. 16, 1998 | (AU) | PP 3010 |
| Dec. 3, 1998 | (AU) | PP 7502 |

(51) Int. Cl.[7] .................................................. H02K 1/22
(52) U.S. Cl. .................. 310/266; 310/154.25; 310/237
(58) Field of Search ................................ 310/266, 237, 310/154.25

(56) References Cited

U.S. PATENT DOCUMENTS 3,863,336 A * 2/1975 Noto et al. .................. 29/597
3,999,092 A * 12/1976 Whiteley ............... 310/156.32
4,008,410 A * 2/1977 Whiteley .................... 310/237
4,082,971 A * 4/1978 Miyake et al. .............. 310/114
5,079,461 A * 1/1992 Schluter et al. ........... 310/67 A
6,081,053 A * 6/2000 Maegawa et al. ......... 310/49 R

* cited by examiner

*Primary Examiner*—Joseph Waks
(74) *Attorney, Agent, or Firm*—Cook, Alex, McFarron, Manzo, Cummings & Mehler, Ltd.

(57) ABSTRACT

An electric machine including a direct current or an alternating current electric motor or generator and having a stator. The stator has an outer circumferential ring of equally spaced magnets. Spaced inwardly radially from the magnets is an inner circumferential ring of equally spaced magnets of opposite polarity to the first ring of magnets. A rotor including a plurality of H shaped energized electromagnetic coils is positioned in the space between the two rings of stator magnets with the rotor connected to a shaft whereby the pole pieces of the H shaped electromagnetic coils are influenced by the magnetic field of the two rings of stator magnets. The direct current machine being arranged to change the direction of electric current flow to the coils of the electromagnets.

3 Claims, 4 Drawing Sheets

ELECTRIC MOTOR

CROSS REFERENCE TO RELATED APPLICATION

This is a continuation-in-part of application Ser. No. 09/673,495, filed Oct. 16, 2000 which claims priority from application PCT/AU 99,00261, filed Apr. 8, 1999. The entire disclosures of said prior applications are considered as part of the disclosure of this application and are incorporated herein by reference.

DESCRIPTION OF THE PRIOR ART

Electrical machines, both motors and machines for generating electrical energy are well known. Each of these operate on the well known magnetic principle of like magnets repel and unlike magnets attract. These machines utilize an electromagnetic coil, the ends of each coil being of opposite polarity.

However the known machines only effectively utilize one end of the electromagnetic coil to produce rotational movement of the rotor.

U.S. Pat. No. 3,979,619 describes an electrical machine having a permanent magnet field structure with a rotating armature for use with fractional horse power axial air gap machines.

The machines known to the inventor only use effectively one end of the electromagnet coils. It is known the electromagnet field generated by a magnet or electromagnetic coil is equal at both ends, and thus only half the available energy is currently being utilized in an electrical machine.

BRIEF SUMMARY OF THE INVENTION

There is provided according to the invention a machine comprising a direct current or an alternating current electric motor or generator, the machine having a stator, the stator having an outer circumferential ring of equally spaced magnets and spaced inwardly radially therefrom an inner circumferential ring of equally spaced magnets of opposite polarity to the first ring of magnets, and a rotor comprising a plurality of H shaped energized electromagnetic coils positioned in the space between the two rings of stator magnets and connected to a shaft whereby the pole pieces of the H shaped electromagnetic coils are influenced by the magnetic field of the two rings of stator magnets, means being provided in the direct current machine to change the direction of electric current flow to the coils of the electromagnets.

Also there is provided according to the invention a machine comprising a direct current or alternating current electric motor or generator, the machine having a driving shaft, a rotor connected to the driving shaft by a radial plate adjacent one end of the driving shaft whereby the rotor is spaced radially from the shaft, the rotor having a plurality of H shaped electromagnetic coils equally spaced around its circumference, each H shaped coil having a radial stem and radially spaced pole pieces, a stator on the machine, the stator including an outer circumferential portion having a first ring of equally spaced magnets co-operating with the outer radial pole pieces of the rotor, and an inner circumferential portion having a second ring of corresponding equally spaced magnets of opposite polarity cooperating with the inner radial pole pieces, direct current machine having control means to change the direction of electric current through the coils of the electromagnetic coils whereby the rotor takes advantage of the electromagnets effect at each end of the H shaped coils.

DETAILED DESCRIPTION OF THE INVENTION

Figure 1:
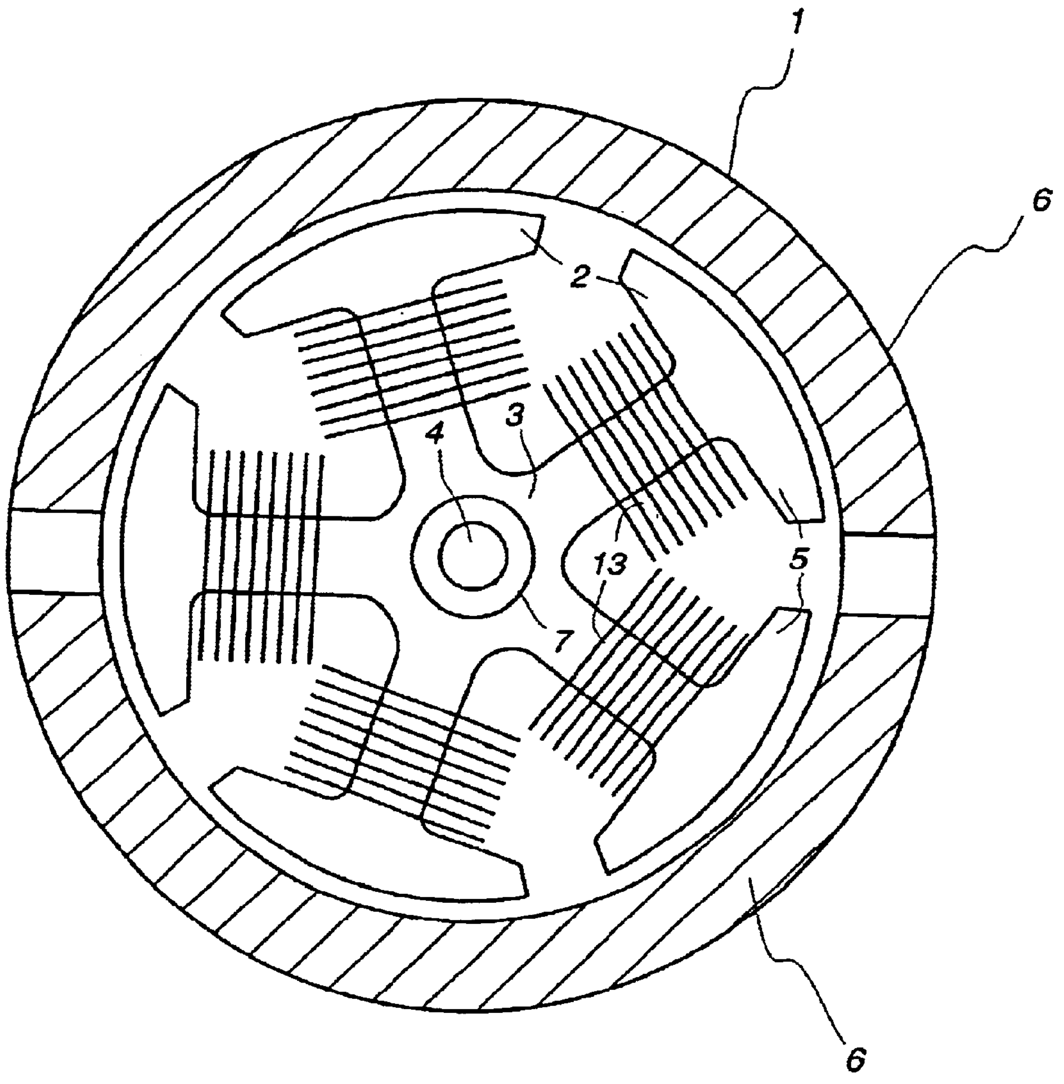
FIG. 1 shows an example of the prior art

Referring firstly to FIG. 1 there is shown diagrammatically one form of prior art electrical machine wherein the rotor 3 is made up of T-shaped electromagnets 8 radiating from the center of the rotor, with the radial end 2 of the segments 8 forming the outer circumference of the rotor 3. Thus only the one end 2 of the energized coil 5 of electromagnets 8 is used to produce rotation of the rotor 3.

Figure 2:
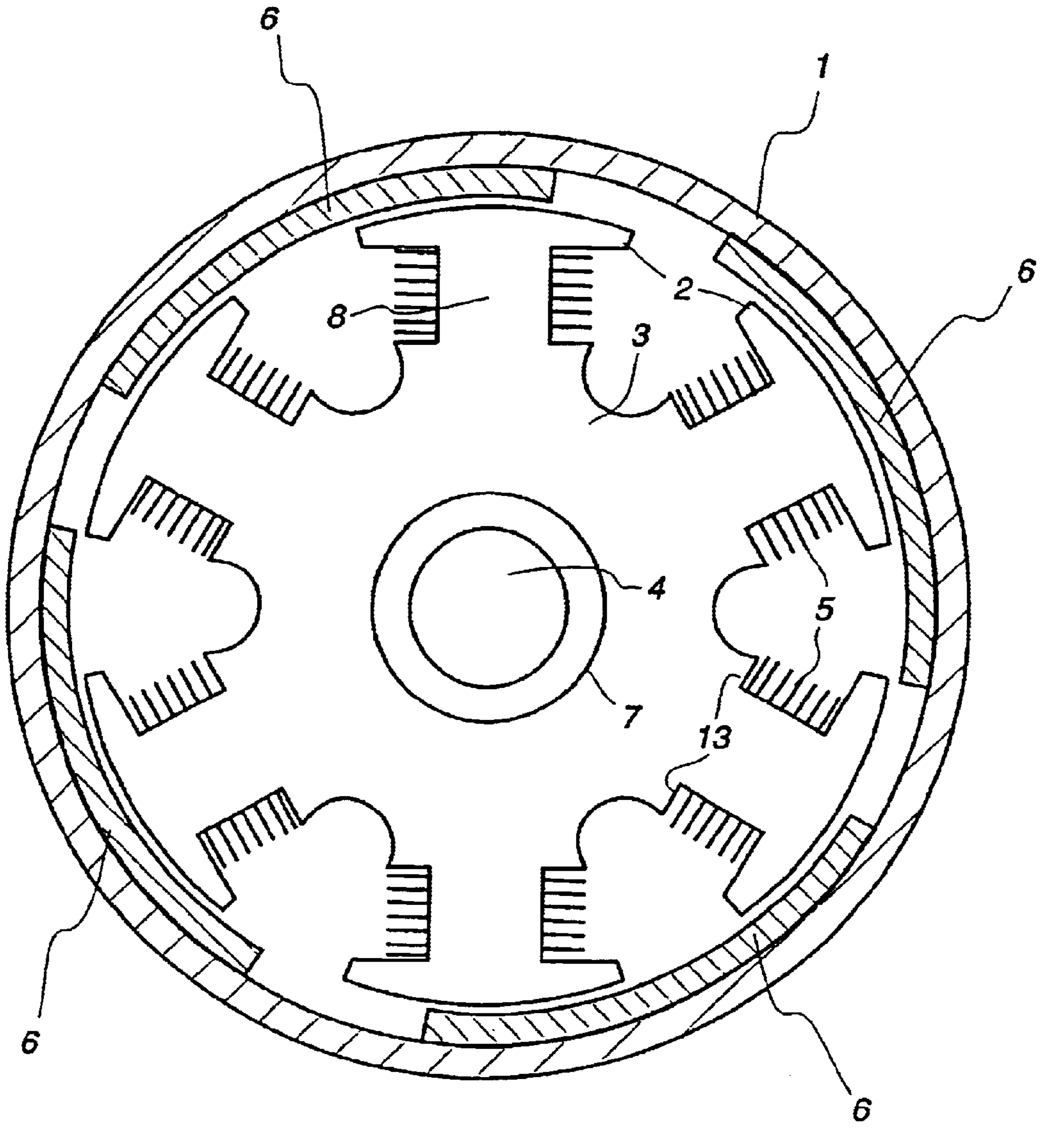
FIG. 2 shows a further example of the prior art

Similarly FIG. 2 shows diagrammatically a further form of known electric motor with rotor 3 made up of radial electromagnetic coils 8 facing outwardly of the rotor 3. Again only one end 2 of the electromagnet coils 8 form a pole piece, this being the only portion of the energized coils being used to produce rotation of the permanent magnets 6 in the stator 1.

Figure 3:
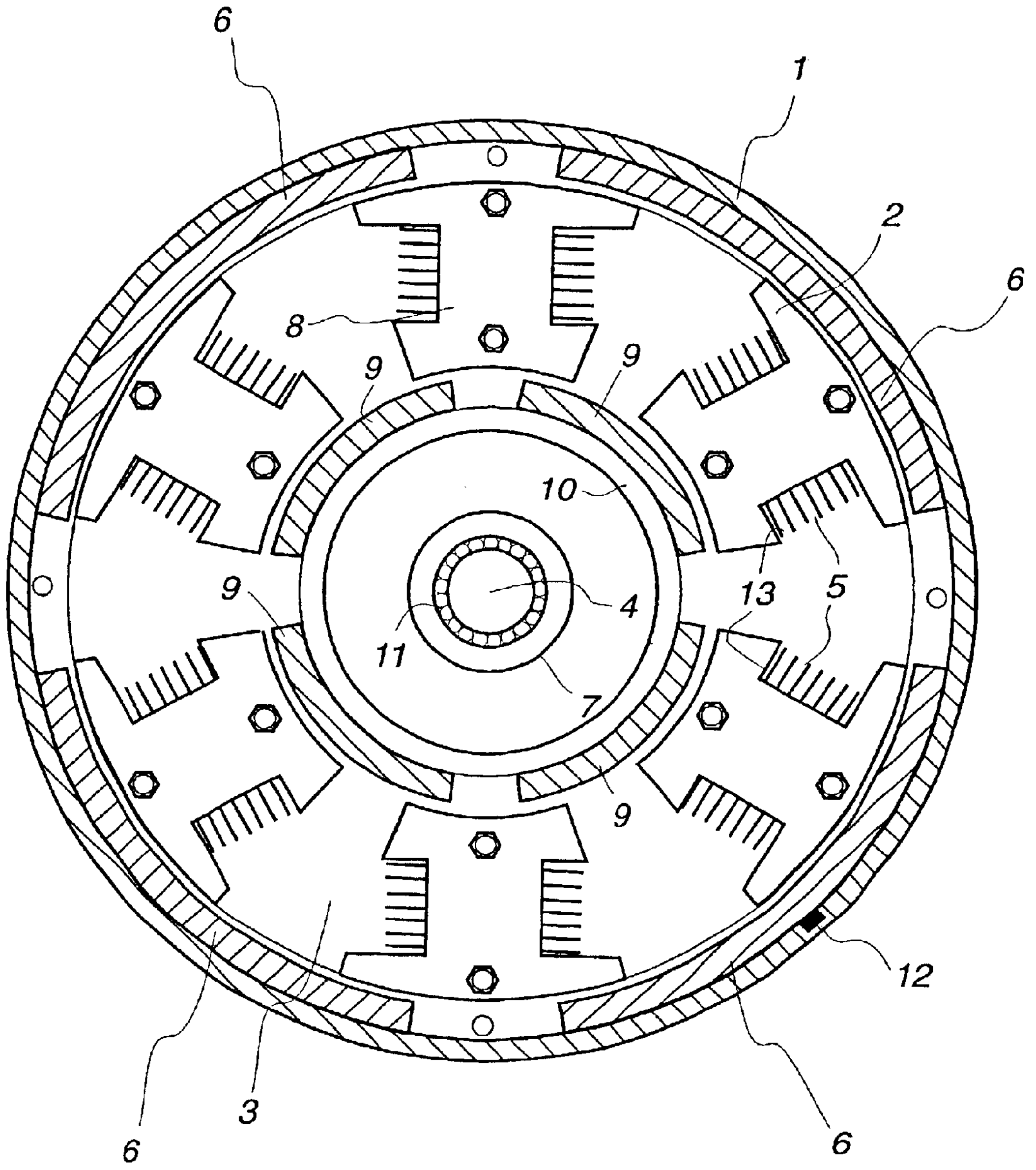
FIG. 3 is an end view of the invention.
Figure 4:
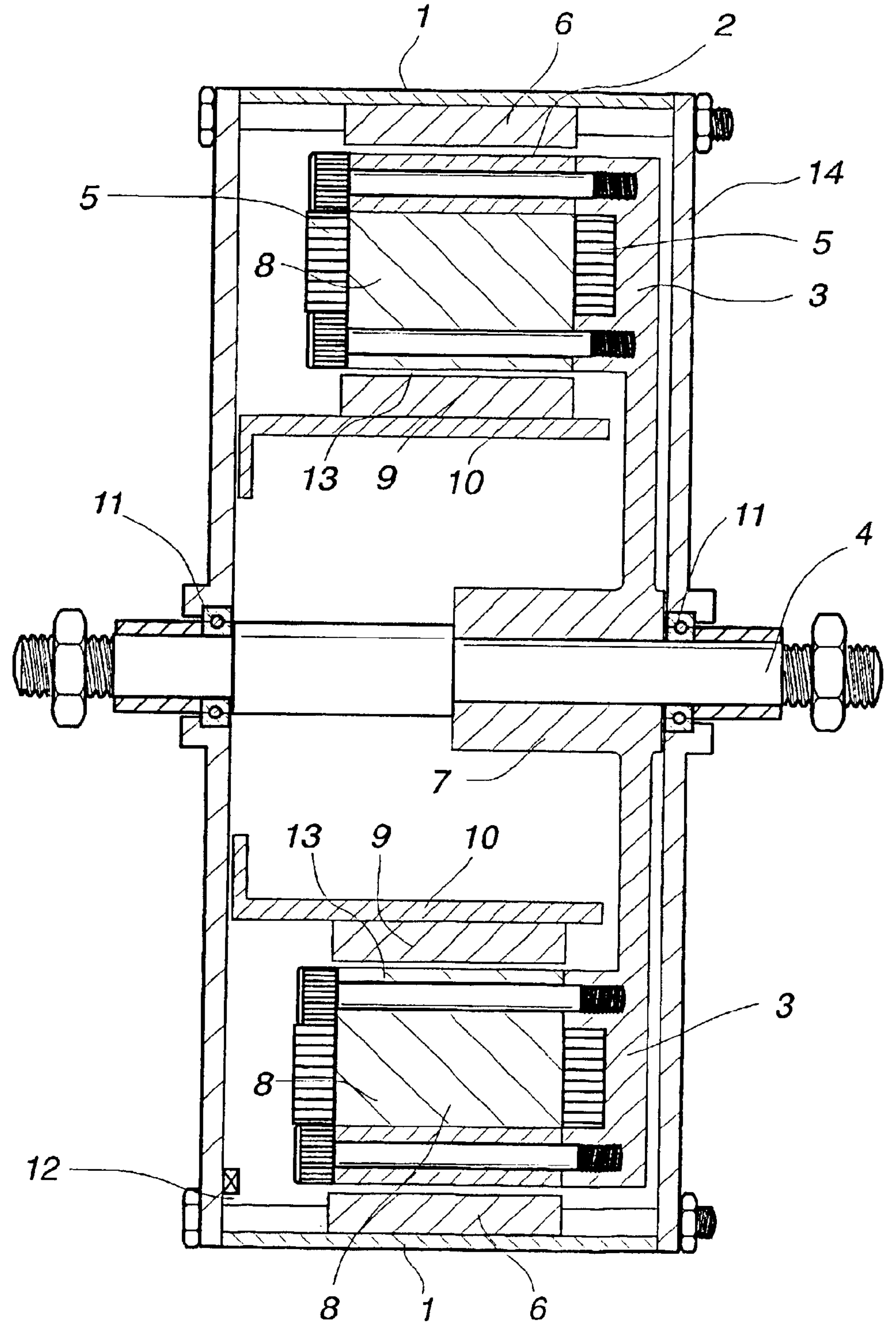
FIG. 4 is a cross sectional view of FIG. 3

Turning now to FIGS. 3 and 4 showing an example of the invention the electrical machine includes a stator 1 formed by side plates 14 in which is mounted a shaft 4 supported by bearings 11 in the stator walls 14. A boss 7 drivingly connected by boss 7 to one end of the shaft 4 drives a radial plate 15 to which the rotor 3 is attached. A plurality of equally spaced H-shaped electromagnetic cores forming electromagnets with outer pole pieces 2 and inner pole pieces 13 the cores supporting windings 5.

The stator 1 has an outer ring of permanent magnets 6 attached to the outer metal ring of the stator and an inner ring of permanent magnets 9 supported on a cylindrical sleeve 10 attached to a stator wall 14 on the opposite end of the shaft to the radial disc 15. Thus the rotor rotates between the two rows of permanent magnets 6 and 9 whereby the permanent magnets 6 react with the pole pieces 2 and the permanent magnets 9 react with the pole pieces 13. The permanent magnets 6 and 9 may be made as continuous rings of suitable magnetic material so that the required number of magnetic poles are permanently positioned in the material. Alternately there may be the required number of individual magnets positioned with opposite magnetic poles adjacent each other.

When the electrical machine is a DC machine, a Hall effect electrical switch 12 is provided to change the direction of flow of the electrical current through the coils 5 thus reversing the polarity of the pole pieces 2 and 13 thus inducing movement of the rotor in a DC motor. Other forms of switching means can be used such as a commutator.

The machine as above described has the electromagnets attached to the rotor. However it is to be realized the electromagnets can be attached to the stator and the two rows of permanent magnets attached to the rotor. The drawings illustrate an electrical machine having six energized coils and electromagnets, and four sets of permanent magnets attached to the stator. However the invention is not to be limited thereto but can include one or more sets of permanent magnets and one or more sets of energized coils forming electromagnets.

Thus it can be seen that by the invention an improved electrical machine is provided. As noted previously, known electrical machines utilize one end of the electromagnets, whereas in the present invention both ends of the electromagnets are used, thus utilizing the total magnetic field produced by the electromagnets.

What is claimed is:

1. An electrical machine comprising a direct current or an alternating current electric motor or generator, the machine having a stator, the stator having an outer circumferential ring of equally spaced magnets and spaced inwardly radially therefrom an inner circumferential ring of equally spaced magnets of opposite polarity to the first ring of magnets, and a rotor comprising a plurality of H shaped energized electromagnetic coils positioned in the space between the two rings of stator magnets and connected to a shaft whereby the pole pieces of the H shaped electromagnetic coils are influenced by the magnetic field of the two rings of stator magnets, means being provided in the direct current machine to change the direction of electric current flow to the coils of the electromagnets.

2. An electrical machine comprising a direct current or alternating current electric motor or generator, the machine having a driving shaft, a rotor connected to the driving shaft by a radial plate adjacent one end of the driving shaft whereby the rotor is spaced radially from the shaft, the rotor having a plurality of H shaped electromagnetic coils equally spaced around its circumference, each H shaped coil having a radial stem and radially spaced pole pieces, a stator on the machine, the stator including an outer circumferential portion having a first ring of equally spaced magnets co-operating with the outer radial pole pieces of the rotor, and an inner circumferential portion having a second ring of corresponding equally spaced magnets of opposite polarity co-operating with the inner radial pole pieces, said direct current machine having control means to change the direction of electric current through the coils of the electromagnetic coils whereby the rotor takes advantage of the electromagnets effect at each end of the H shaped coils.

3. An electrical machine as defined in claim 2 characterized in that the control means can comprise a Hall effect switch.

* * * * *